US009902105B2

(12) United States Patent
 Tanner

(10) Patent No.: US 9,902,105 B2
(45) Date of Patent: Feb. 27, 2018

(54) APPARATUS FOR CHARGING A FURTHER PROCESSING SYSTEM WITH OBJECTS WHICH ARE IN THE FORM OF BULK MATERIAL

(71) Applicant: M. Tanner AG, Illnau (CH)

(72) Inventor: Marcel Tanner, Bassersdorf (CH)

(73) Assignee: M. Tanner AG, Illnau (CH)

( * ) Notice: Subject to any disclaimer, the term of this patent is extended or adjusted under 35 U.S.C. 154(b) by 0 days.

(21) Appl. No.: 15/492,729

(22) Filed: Apr. 20, 2017

(65) Prior Publication Data
US 2017/0312974 A1    Nov. 2, 2017

(30) Foreign Application Priority Data

Apr. 29, 2016 (EP) .................................... 16167736

(51) Int. Cl.
| *B65G 47/24* | (2006.01) |
| *B65G 47/02* | (2006.01) |
| *B65G 43/08* | (2006.01) |
| *B29C 49/42* | (2006.01) |
| *B29C 49/78* | (2006.01) |
| *B65G 47/19* | (2006.01) |
| *B29K 67/00* | (2006.01) |
| *B29L 31/00* | (2006.01) |

(52) U.S. Cl.
CPC ...... *B29C 49/4205* (2013.01); *B29C 49/4236* (2013.01); *B29C 49/78* (2013.01); *B65G 47/19* (2013.01); *B65G 47/24* (2013.01); *B29C 2949/7826* (2013.01); *B29C 2949/78109* (2013.01); *B29C 2949/78571* (2013.01); *B29C 2949/78773* (2013.01); *B29C 2949/78957* (2013.01); *B29K 2067/003* (2013.01); *B29L 2031/7158* (2013.01)

(58) Field of Classification Search
None
See application file for complete search history.

(56) References Cited

U.S. PATENT DOCUMENTS 8,204,621 B2 *   6/2012  Imai ........................ B65B 5/103
                                                                221/241
2002/0060129 A1*  5/2002  Cooper, III ........ B65G 47/1492
                                                                198/443

FOREIGN PATENT DOCUMENTS

DE    10 2007 005489 A1    7/2007
EP          1925575 A1    5/2008
(Continued)

OTHER PUBLICATIONS

International Search Report for European Patent Application No. 16167736.4 filed Apr. 29, 2016.

*Primary Examiner* — Kavel Singh
(74) *Attorney, Agent, or Firm* — Notaro, Michalos & Zaccaria P.C.

(57) ABSTRACT

Objects, such as, for example, preforms for producing PET bottles, are feedable to silo as bulk material by a bulk material feeding device. A fill level sensor of the silo is connected to the control device. The control device actuates the feed drive in order to refill the silo with objects in dependence on the determined fill level of the silo. Connected downstream of the silo is an overhead conveyor and downstream of the overhead conveyor a separating-into-singles system. Both the overhead conveyor and the separating-into-singles system comprise sensors and drives, all the sensors being connected to the control device and the control device controlling all the drives.

14 Claims, 2 Drawing Sheets

(56) References Cited

FOREIGN PATENT DOCUMENTS

Figure 1:
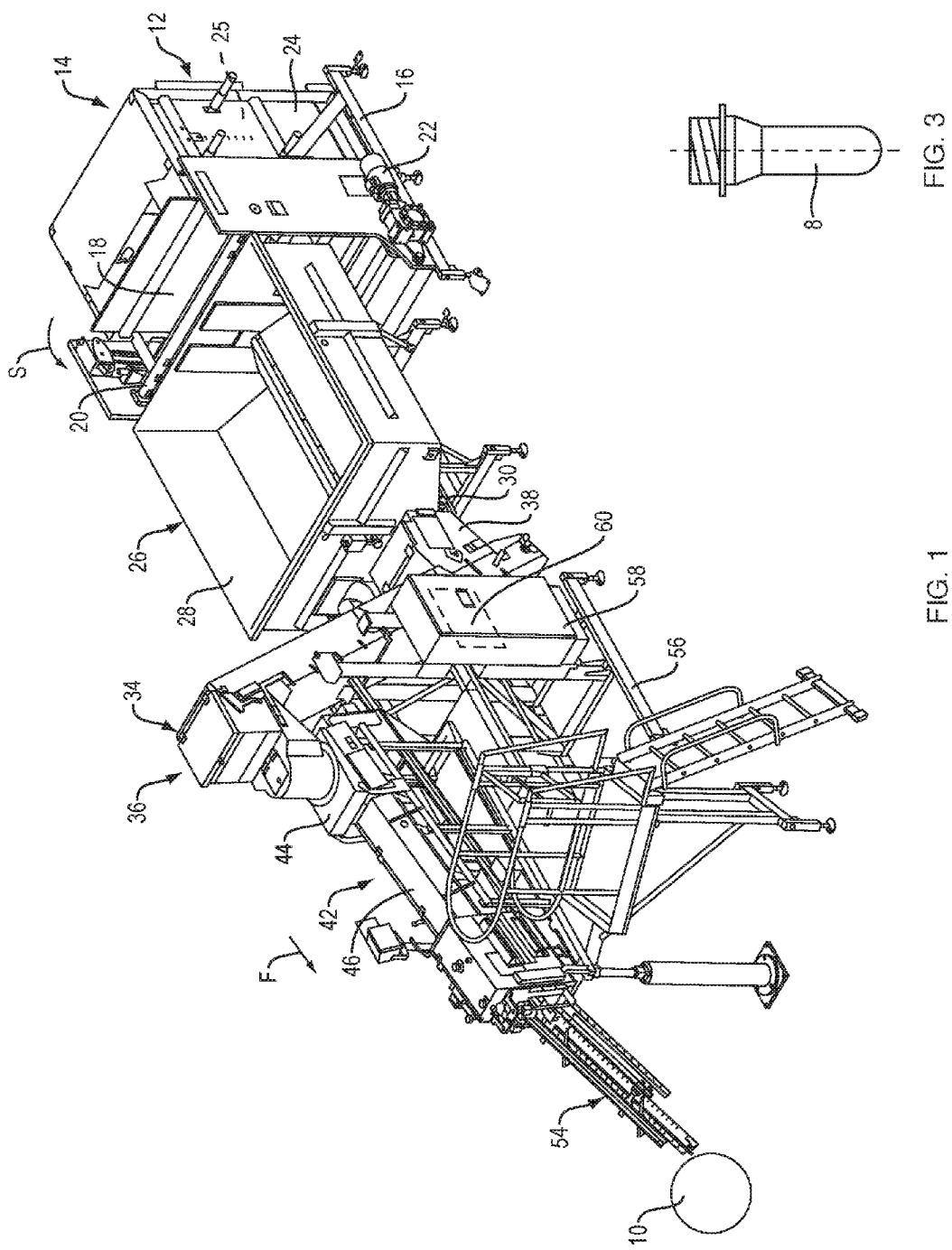

| | | |
|---|---|---|
| EP | 2 441 708 A1 | 4/2012 |
| EP | 2 489 613 A1 | 8/2012 |
| EP | 2 977 183 A1 | 1/2016 |
| WO | 2010/006461 A1 | 7/2009 |
| WO | 2010/006462 A1 | 1/2010 |
| WO | 2011/069268 A1 | 11/2010 |
| WO | 2012/100357 A1 | 8/2012 |
| WO | 2010/126129 A1 | 9/2012 |
| WO | 2012/122632 A1 | 9/2012 |
| WO | 2012/126129 A1 | 9/2012 |

\* cited by examiner

APPARATUS FOR CHARGING A FURTHER PROCESSING SYSTEM WITH OBJECTS WHICH ARE IN THE FORM OF BULK MATERIAL

The present invention relates to an apparatus for charging a further processing system with objects which are in the form of bulk material.

Apparatuses of this type are known in general and are used, in particular, for charging stretch blow machines with preforms for producing PET bottles or for charging inspection machines with objects which are to be inspected by said machines.

Document WO 2012/126129 A1 discloses a feeding device which is realized as a tipping device, has its own control device and feeds objects which are delivered as bulk material, such as preforms for hollow bodies, to a silo for refilling said silo. A control device is connected to a tipping drive, which forms a feed drive, and serves, in particular, for the purpose of ascertaining the fill level of the silo and, where necessary, refilling objects or rather preforms into the silo by means of the tipping device.

A conveyor device serves for the purpose of removing objects or rather preforms out of the silo and conveying them by means of a conveyor belt to a higher plane. In this case, this is an overhead conveyor which moves the objects or rather preforms to a transfer region. The objects or rather preforms are transferred from said transfer region to a separating-into-singles system which serves, in a known manner, for the purpose of positioning the objects or rather preforms correctly and arranging them in a row.

In the known devices for charging the further processing system with objects which are in the form of bulk material, further control devices are regularly present in addition to the control device of the feeding device, such as, for example, for the conveyor device and the separating-into-singles system.

Separating-into-singles systems are also known, for example document EP 2 441 708 A1 thus discloses a device and a method for aligning objects, in particular preforms for producing plastics material containers. The preforms are transferred to the input side of an alignment section by means of a conveyor device. In addition, the device is provided with an ejecting device which, by means of a return conveyor, returns non-aligned preforms, preferably directly to the input side of the alignment section.

Separating-into-singles systems with ejecting devices are also disclosed in documents WO 2010/006461 A1, WO 2010/006462 A1 and WO 2011/069268 A1.

The known apparatuses for charging a further processing system with objects which are in the form of bulk material require a great deal of space and are expensive and complex in regard to control measures.

It is consequently an object of the present invention to develop a generic apparatus further in such a manner that it can be realized compactly with simpler control means.

Said object is achieved with an apparatus for charging a further processing system with objects which are in the form of bulk material with the features of claim 1.

The apparatus comprises a bulk material feeding device with a feed drive and a silo. Objects which are delivered as bulk material, such as preforms for the production of PET bottles, caps for the production of coffee capsules or other containers or hollow bodies, are feedable to said silo by means of the bulk material feeding device for intermediate storage. A control device actuates the feed drive in order to refill the silo with objects; this occurs at least in automatic mode.

A conveyor device, in particular an overhead conveyor, which comprises a conveyor drive, is connected downstream of the silo and a separating-into-singles system which comprises a separating-into-singles drive is connected downstream of said conveyor device.

The conveyor device is intended for the purpose of removing objects from the silo or rather of receiving objects fed to it from the silo and feeding them in a disordered manner to the separating-into-singles system. A disordered manner means that the objects comprise an arbitrary alignment and can be conveyed at a varying number per unit time.

The separating-into-singles system aligns the objects fed to it such that they can be conveyed further in a desired orientation and, in a preferred manner, in a row one behind another in the direction of the further processing system.

Both the conveyor device and the separating-into-singles system comprise sensors which are connected to the control device; the control device also controls the conveyor drive and the separating-into-singles drive in dependence on the signals from said sensors.

The apparatus according to the invention consequently comprises one single control device to which the sensors output their signals and which actuates the drives in dependence on signals from said sensors. Sensors can also be formed by switches which carry out the function of a sensor.

In a preferred manner, the control device comprises one single programmable control means which controls the entire apparatus.

The silo preferably has assigned thereto a fill level sensor which is connected to the control device. The control device actuates the feed drive in order to refill the silo with objects in dependence on the fill level of the silo which is determined by way of the fill level sensor—at least in automatic mode.

The silo can be realized as a so-called silo rucksack. It can, however, also be realized as a so-called silo belt, comprising a silo container and a silo conveyor belt. This latter is driven by means of a belt drive which is controlled by the control device. Objects are fed from the silo container to the silo conveyor belt or rather it removes them from the silo container and conveys them to the conveyor device.

The conveyor device is realized in a preferred manner as an overhead conveyor.

In its upstream starting region, the conveyor device preferably comprises a takeover funnel into which the objects delivered from the silo fall.

In a preferred manner, in the starting region, the conveyor device comprises an overfill sensor, which, where applicable, is assigned to the takeover funnel and is connected to the control device. If the overfill sensor detects an overfill with objects in the starting region, it outputs an overfill signal to the control device, which stops the belt drive or rather the feeding of objects out of the silo in order to prevent further feeding of objects until the overfill sensor detects that the overfill level has fallen below again as a result of the forwarding of objects by the conveyor device. A corresponding signal from the overfill sensor to the control device causes said control device to set the belt drive or rather the feeding of objects out of the silo in motion once again.

In a preferred manner, in its inlet region, the separating-into-singles system comprises a conveyor funnel into which the conveyor device delivers the objects.

In a preferred manner, in its inlet region, the separating-into-singles system comprises an overfilling sensor which, where applicable, is assigned to the conveyor funnel. If the overfilling sensor detects a predetermined overfill level has been reached, it outputs an overfilling signal to the control device which stops the conveyor drive. Where applicable, the belt drive of the silo conveyor belt is also stopped.

If the overfilling sensor detects the overfill level or a predetermined top-up level has fallen below, it outputs a corresponding signal to the control device such that said control device is able to restart the conveyor drive and, where applicable, the belt drive.

In a preferred manner, the bulk material feeding device is realized as a tipping device, as is disclosed in document WO 2012/126129 A1. The silo disclosed here for intermediate storage comprises a raisable cover which is raisable from the silo for refilling purposes by means of a mechanical connecting and power transmitting element of the tipping device.

A cover of this type can be present in conjunction with the present invention, but does not have to be present.

The tipping device comprises a tipper part, which is pivotably mounted on a frame and, controlled by the control device, is pivotable back and forth within an operating range between a lower loading position and an upper unloading position by means of a feed drive which is realized as a tipping drive.

The loading position and the unloading position each have assigned thereto a positional switch which is connected to the control device, forms a sensor and outputs a signal to the control device when the tipper part reaches the loading position or rather unloading position. The control device then stops the feed drive.

For safety reasons, in a preferred manner the loading position and the unloading position each have assigned thereto an emergency limit switch which also forms a sensor and is also connected to the control device. The control device triggers an emergency stop of the feed drive or rather of the tipping drive if the tipper part overshoots the operating range and, at the same time, actuates the relevant emergency limit switch.

In a preferred manner, the bulk material feeding device or rather the tipping device comprises a safety light grid which is connected to the control device. In a preferred manner, said safety light grid is arranged in the loading region of the tipping device. If the safety light grid detects an obstacle, it outputs a corresponding signal to the control device which stops the feed drive or rather the tipping drive in a reliable manner.

In a preferred manner, the tipping device is realized in such a manner that, with the tipper part situated in the loading position, a conveyor container with objects can be moved into the pivotable tipper part or an empty conveyor container can be removed from said pivotable tipper part. This is effected in the majority of cases using floor-level conveyors, e.g. using fork lift trucks.

To empty the conveyor container, the tipper part together with the conveyor container received by said tipper part is pivoted into the unloading position in which the parts are conveyed or rather poured out of the conveyor container into the silo.

The separating-into-singles system can be realized as is disclosed, for example, in documents EP 2 441 708 A1, WO 2010/006461 A1, WO 2010/006462 A1 and WO 2011/069268 A1.

The separating-into-singles system, which is realized in a preferred manner as a roller sorter, comprises in a preferred manner a maximum sensor which is connected to the control device and is arranged in a preferred manner in an upstream end region of the separating-into-singles system, where applicable at a spacing from the conveyor funnel. If the maximum sensor outputs a maximum signal to the control device, said control device stops the conveyor drive and, where applicable, the belt drive of the silo conveyor belt.

The maximum sensor ascertains whether a separating-into-singles system or rather an alignment section of the separating-into-singles system is filled with objects up to the limit of its detection range or not. If it is not filled, the conveyor device can continue to feed objects to the separating-into-singles system.

In addition, in a preferred manner, the separating-into-singles system comprises a minimum sensor which is also connected to the control device. Said minimum sensor is arranged in a preferred manner in a downstream end region of the separating-into-singles system or rather of the alignment section. If the minimum sensor outputs a minimum signal to the control device, said control device increases the speed of the separating-into-singles drive and, where applicable, of the conveyor drive and, if needs be, of the belt drive.

In a preferred manner, the separating-into-singles system, in a preferred manner approximately in the middle of the alignment section, and consequently, if present, between the maximum sensor and the minimum sensor, comprises a normal sensor which is also connected to the control device. Said control device controls the speed of the separating-into-singles drive in dependence on the normal signal output by the normal sensor.

The normal sensor ascertains for example, whether the separating-into-singles system or rather the alignment section is filled with objects from the downstream end up to said normal sensor. If this is the case and if the maximum sensor, which is present if needs be, ascertains that the separating-into-singles system or rather the alignment section is not filled with objects up to the limit of its detection range, the control device can allow the separating-into-singles drive to run at a constant speed.

If the normal sensor ascertains, for example, that the separating-into-singles system or rather the alignment section is not filled with objects up to the limit of said normal sensor, the control device actuates the separating-into-singles drive in such a manner that it operates at a faster speed.

In a preferred manner, the separating-into-singles system has connected downstream thereof a feed rail. A preferred embodiment of a feed rail is disclosed, for example, in document WO 2012/100357 A1. The feed rail takes over objects which have been aligned and arranged in a row one after another by the separating-into-singles system and guides them, usually sliding on sloping rails, to the further processing system which is connected downstream.

The feed rail, however, can also be realized as a horizontal rail; the aligned objects, which are arranged one behind another, are conveyed in a sliding manner along the rails thereof by means of an air or belt drive.

In a preferred manner, in an upstream end region which faces the separating-into-singles system, the feed rail comprises a rail maximum sensor which is connected to the control device. When the feed rail is being filled with aligned objects when the apparatus is started up, the maximum sensor outputs a rail maximum signal to the control device when the feed rail is filled with objects up to the limit of the maximum sensor.

The control device, as a result, outputs a ready signal to the further processing system. This ensures that the entire system can be started up in a reliable manner.

In many cases, further processing systems comprise an inlet unit to which the feed rail feeds the aligned objects. The inlet units in the majority of cases do not allow objects to be fed during system start-up until the further processing system has received a ready signal.

However, it is also possible for the feed rail to comprise, at a downstream end, a lock which prevents objects being delivered to the further processing system for filling the feed rail with aligned objects when the apparatus is started up. In said case, the control device opens the lock when it has received a rail maximum signal from the rail maximum sensor. This ensures that the entire system can be started up in a reliable manner.

In a preferred manner, in a downstream end region, where applicable upstream of the lock, the feed rail comprises a rail minimum sensor which is connected to the control device. Said rail minimum sensor outputs a rail minimum signal to the control device if it ascertains that no objects are present at said rail minimum sensor. In said case, the control device outputs a stop signal to the further processing system as objects can no longer be delivered in a reliable manner in the desired cycle for further processing.

In a preferred manner, the separating-into-singles system comprises a return belt which is driven by a return drive which is controlled by the control device. Said return belt is intended for the purpose of conveying incorrectly aligned objects which have been separated out by the separating-into-singles system either back into the silo or to the conveyor device or to the start of the separating-into-singles system.

In a preferred embodiment, the tipping device comprises a safety bolt by means of which the pivoted-up tipper part can be prevented mechanically from pivoting down. This is for safety reasons, for example when a person has to carry out work underneath the tipper part. A switch, which is connected to the control device, forms a sensor and, when the safety bolt is activated, outputs a corresponding signal to the control device which prevents the motors from starting-up, is present in a preferred manner with the safety bolt.

Figure 2:
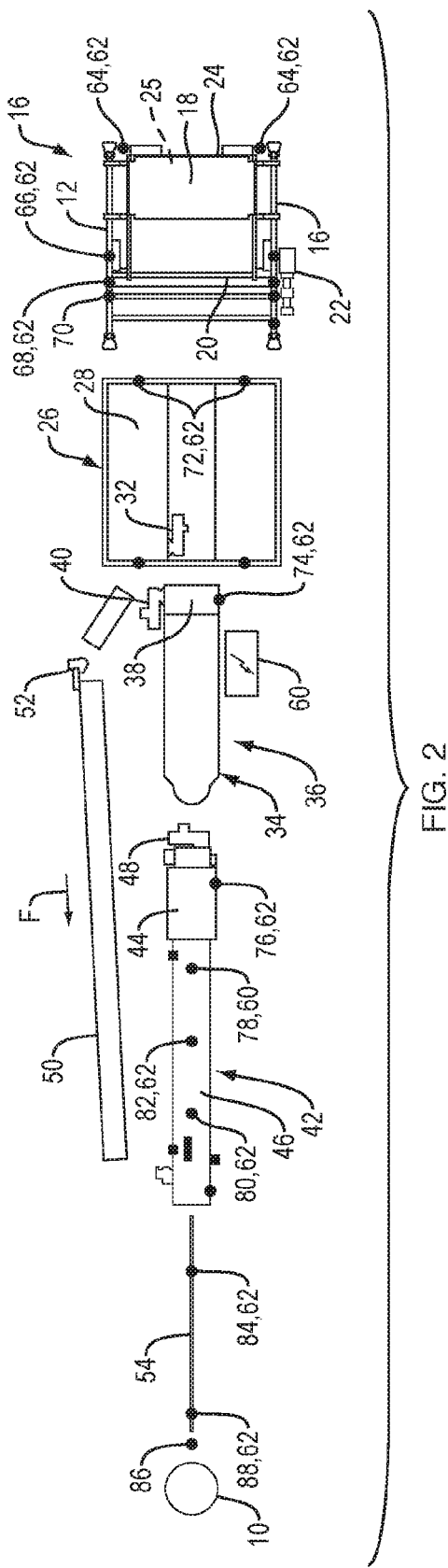

The present invention is explained in more detail by way of an exemplary embodiment which is shown in the drawing, in which, in a purely schematic manner:

FIG. 1 shows a perspective representation of an apparatus for charging a further processing system with objects which are in the form of bulk material, having a feeding device which is realized as a tipping device, a silo belt, a conveyor device which is realized as an overhead conveyor, a separating-into-singles system as well as a feed rail which leads away from said separating-into-singles system;

FIG. 2 shows a top view in a simplified manner of the apparatus according to FIG. 1 with the drives and the positions of the sensors; and FIG. 3 shows a view of a preform for producing a PET bottle.

The apparatus shown in FIG. 1 is intended for the purpose of aligning objects, in the present case preforms 8, which are delivered in conveyor containers as bulk material, and feeding them arranged in a row one after another in the desired alignment to a further processing system 10 which is connected downstream of the apparatus. Said further processing system is shown symbolically as a circle; in the present case it is a generally known stretch blow machine for producing PET bottles from preforms 8. Preforms are known in general, an example of a preform 8 is shown in FIG. 3.

The apparatus comprises a feeding device 14 which is realized as a tipping device 12. A tipper part 18 is mounted so as to be pivotable about a horizontal pivot axis 20 on a frame-like frame 16 which is fastened to a floor or a base. A feed drive 22 in the form of an electric gear motor, the output shaft of which is connected to the tipper part 18, is fastened to the frame 16 in order to pivot said tipper part from a lower loading position 24, shown in FIG. 1, about the pivot axis 20 in the direction of the arrow S into an upper unloading position and back again.

The tipping device 12 is, for example, identically designed as is disclosed in document WO 2012/126129 A1. Reference is made explicitly to the disclosure in said document; the cover of the silo shown there not being necessary, but being able to be present.

The tipper part 18 is intended for the purpose of receiving, in the loading position 24, a conveyor container 25—for example a cardboard box or a metal box—which is loaded with preforms 8 as bulk material, it being possible for the conveyor container to be moved into the tipper part 18, for example by means of a fork lift truck.

It is also possible to remove an emptied conveyor container 25 from the tipper part 18 in the loading position 24.

To empty the conveyor container 25, the tipper part 18, driven by the feed drive 22, is pivoted up out of the loading position in the pivoting direction S into the unloading position, whereupon the preforms 8 slide out of the conveying container, and consequently the tipper part 18, as a result of their own weight into a silo 26 which is connected directly downstream of the tipping device 12.

The silo 26 in the present case is a so-called silo belt, the silo 26 comprising a silo container 28 and a silo conveyor belt 30.

In the present case, the floor of the silo container 28 is formed by four flat plates which—when viewed in cross section—are arranged in a W-shaped manner. Between the two lateral plates and the central plates there is in each case an outlet gap, through which preforms 8 are able to slide downward onto the silo conveyor belt 30 which is run beneath the silo container 28.

A belt drive 32 (see FIG. 2), which in the present case is also realized as an electric gear motor and which drives the silo conveyor belt 30 which is realized as a belt conveyor, is arranged on a silo frame which bears the silo container 28 and the silo conveyor belt 30.

A conveyor device 36, which is realized as an overhead conveyor 34, is connected downstream of the silo 26. Said conveyor device, as is disclosed, for example, in document WO 2012/126129 A1, comprises a conveyor belt with conveyor webs fastened thereon. In the bottom starting region of the conveyor device 36, said conveyor device comprises a receiving funnel 38, to which the silo conveyor belt 30 conveys the preforms 8. In the receiving funnel 38, the conveyor belt entrains preforms 8 by way of its webs and conveys them to the upper, downstream end of the overhead conveyor 34. In the region of the overhead conveyor 34, the preforms 8 comprise an arbitrary position and a varying number of preforms 8 can be entrained in each case by a web. The conveyor device 36 or rather the overhead conveyor 34 is driven by means of a conveyor drive 40 (see FIG. 2) also in the form of an electric gear motor.

A separating-into-singles system 42 is connected directly downstream of the conveyor device 36. On the input side, said separating-into-singles system comprises a conveyor funnel 44, into which slide the preforms 8 which are conveyed upward by the overhead conveyor 34. In the exemplary embodiment shown, this is a roller sorter, as is disclosed, for example, in documents EP 1 925 575 A1 and EP 2 441 708 A1.

Following the conveyor funnel 44, when viewed in the conveying direction F, is an alignment section 46 of known design which is adapted to the objects to be sorted. Roller sorters include in a known manner two rollers or rather rows of rollers which are located opposite one another at an axial spacing. The preforms 8 to be aligned can only enter the gap between the rollers or rather rows of rollers in a certain alignment and in said gap they are secured against slipping, for example as a result of the collar that is usually present in the case of preforms 8. The alignment section extends downward at an angle between its input side and its output side such that gravitational support for the aligning and the conveying of the preforms 8 is provided.

The separating-into-singles system 42 or rather, in the present case of a roller sorter, the two rollers or rather rows of rollers are driven by a separating-into-singles drive 48 which is also realized as an electric gear motor.

In the downstream end region, the separating-into-singles system comprises a known ejecting device, by means of which incorrectly aligned preforms 8 are ejected and fed in a known manner to a return belt 50 (see FIG. 2). The return belt is driven by means of a return drive 52 which is also realized as an electric gear motor.

The return belt, in the exemplary embodiment shown, guides the ejected preforms 8 back to the receiving funnel 38 of the conveyor device 36 such that they are able to be fed anew to the separating-into-singles system 42.

In the exemplary embodiment shown, following the separating-into-singles system 42 is a feed rail 54 which slopes in the conveying direction F as is disclosed, for example, in document WO 2012/100357 A1. The preforms 8, aligned in their desired position and arranged one behind another, are transferred from the separating-into-singles system 42 to the feed rail 54, along which they slide, aligned and following one after another in a row, to the further processing system 10.

A control box 58, in which a control device 60 with a programmable control means is situated, is additionally fastened on the machine frame 56, on which both the conveyor device 36 and the separating-into-singles system 42 are arranged.

All the drives, that is to say the feed drive 22, the belt drive 32, the conveyor drive 40, the separating-into-singles drive 48 and the return drive 52, are actuated by the single control device 60 of the apparatus.

As can be explained in conjunction with FIG. 2, the apparatus also comprises, along with the mechanical components and the drives 22, 32, 40, 48 and 52, a number of sensors 62 which can also be present in the form of switches. In the embodiment shown, all the sensors 62 are connected to the control device 60 which actuates the named drives 22, 32, 40 48 and 52 as a result of the relevant sensor signals.

In the exemplary embodiment shown, the tipping device 12 comprises a safety light grid 64 on the loading side. If an obstacle is present in the safety light grid 64, the corresponding signal transmitted to the control device 60 results in said control device immediately stopping the movement of the feed drive 22—in the present case the drive for tipping the tipper part 18—or rather in preventing it from pivoting.

A first positional switch 66, which is assigned to the loading position 24 of the tipper part 18, and a second positional switch 68, which is assigned to the unloading position, is fastened on the frame 16 of the tipping device 12. The tipper part 18 actuates the first positional switch 66 in its loading position 24 and correspondingly the second positional switch 68 in the unloading position. The two positional switches 66, 68 form sensors 62 and are also connected to the control device 60.

If the tipper part 18 is loaded with a conveying container 25 with preforms 8 and if said preforms are to be fed to the silo 26, the control device 60 controls the feed drive 22 in such a manner that it pivots the tipper part 18 from the loading position 24 about the operating range to the upper unloading position, where the tipper part 18 actuates the second positional switch 68. As a result of the signal from said second positional switch 68, the feed drive 22 is shut-off by the control device 60. If the preforms 8 are discharged into the silo 26, the control device 60 controls the feed drive 22 in the opposite direction in such a manner that the tipper part 18, together with the empty container 25, is pivoted downward out of the upper unloading position into the loading position 24. Once said loading position 24 is reached again, the first positional switch 66 is actuated by the tipper part 18, the signal thereof causing the control device 60 to switch off the feed drive 22.

The emptied conveying container 25 can then be removed from the tipper part 18, and said tipper part can be loaded with a new, further conveying container 25 which contains preforms 8 as bulk material.

One emergency limit switch 70 each is additionally fastened on the frame 16 adjacent to the first positional switch 66 and the second positional switch 68, but outside the operating range. Should the tipper part 18 pivot outside the operating range due to a fault, the signal of the corresponding emergency limit switch 70 actuated by the tipper part 18 initiates the control device 60 to trigger an emergency of the tipping device 12.

In addition, the pivoted-up tipper part 18 can be prevented mechanically from pivoting down by means of a safety bolt on the frame 16. A switch which forms a sensor 62 ascertains whether the safety bolt is set or not. If it is, the signal it outputs to the control device 60 leads to the feed drive 22 not being actuated. If it is not, the feed drive 22 can be actuated to pivot the tipper part 18.

Two fill level sensors 72 are assigned to the silo 26. These monitor the fill level of the silo 26 with preforms 8 above the two silo valleys which are generated by the W-shaped realization of the floor of the silo 26.

The fill level sensors 72 are also connected to the control device 60. If a predetermined fill level is fallen below, the control device 60 actuates the tipping device 12 in such a manner that a conveyor container 25 filled with preforms 8 in the tipper part 18 is emptied into the silo 26 to fill up said silo. This is effected in such a manner when operated automatically or rather in automatic mode.

It is also possible, in manual mode, to control the tipping as a result of signals given manually.

The overhead conveyor 34 comprises in its starting region, that is to say in the area of the receiving funnel 38, an overfill sensor 74 which is also connected to the control device 60. If the overfill sensor 74 detects a predetermined maximum fill level of the receiving funnel 38 with preforms 8, it outputs an overfill signal to the control device 60. Said control device then stops the belt drive 32 such that the silo conveyor belt 30 does not feed any further preforms 8 to the conveyor device 36, or rather to the overhead conveyor 34. If the fill level in the receiving funnel 38 drops below a certain level again, the overfill sensor 74 outputs a corresponding signal to the control device 60, which actuates the belt drive 32 again in order to feed preforms 8 once more to the overhead conveyor 34.

In a corresponding manner, in its inlet region, in the conveyor funnel 44 in the exemplary embodiment shown, the separating-into-singles system 42 comprises an overfilling sensor 76. If said overfilling sensor ascertains a predetermined level of preforms 8 present in the conveyor funnel 44, it outputs an overfilling signal to the control device 60. Said control device stops the conveyor drive 40 such that the overhead conveyor 34 temporarily does not feed any further preforms 8 to the separating-into-singles system 42. If the level of preforms 8 in the conveyor funnel 44 drops below a certain level again, the corresponding signal of the overfilling sensor 76 in the control device 60 results in said control device setting the conveyor drive 40 in motion again in order to feed preforms 8 once again to the separating-into-singles system 42.

The control device also controls the belt drive 32 in a manner corresponding to the conveyor drive 40 as a result of the signals from the overfilling sensor 76.

The separating-into-singles system 42 comprises a maximum sensor 78 downstream of the conveyor funnel 44, but in the vicinity thereof. Said maximum sensor is arranged in the upward end region of the alignment section 46 and outputs a maximum signal to the control device 60 if the alignment section 46 is filled with preforms 8 from the downstream end up to the maximum sensor 78. If a maximum signal occurs in the control device 60, said control device stops the conveyor drive 40 and the belt drive 32 such that temporarily no further preforms 8 are fed to the separating-into-singles system 42.

In addition, the separating-into-singles system 42 comprises a minimum sensor 80 in a downstream end region, at a spacing from the end of the alignment section. If said minimum sensor ascertains that there are no more aligned preforms 8 present within its sensor range, it outputs a minimum signal to the control device, as a result of which the control device 60 increases the speed of the separating-into-singles drive 48 such that the separating-into-singles system 42, or rather the alignment section 46 thereof, is once again filled with aligned preforms 8.

In addition, the separating-into-singles system 42 comprises a normal sensor 82 in its center region, that is to say between the maximum sensor 78 and the minimum sensor 80. Said normal sensor detects whether aligned preforms 8 are present in the alignment section 46 up to its sensor range. Said control device controls the speed of the separating-into-singles drive 48 in dependence on the normal signal output to the control device 60 by the normal sensor 82.

In its upstream end region of the feed rail 54, said feed rail has assigned thereto a rail maximum sensor 84 which is connected to the control device 60. If the feed rail 54—when the apparatus is started up—is filled up to the rail maximum sensor 84 with aligned, consecutive preforms 8, the rail maximum sensor 84 outputs a rail maximum signal to the control device 60, which outputs a ready signal to the further processing system. The further processing system can be started up as a result.

As an alternative to this, the guide rail 54 can comprise a lock at its downstream end. Said lock is intended, when the apparatus is started up and the feed rail 54 is consequently to be filled with aligned preforms 8, for the purpose of preventing the output of preforms 8 to the further processing system 10 until the feed rail 54 is filled up to the rail maximum sensor 84 with aligned, consecutive preforms 8. If this is the case, the rail maximum sensor 84 outputs a rail maximum signal to the control device 60 which opens the lock 86 such that preforms 8 are then able to be fed to the further processing system 10.

In addition, in a downstream end region, where applicable upstream of the lock 86, the feed rail 54 has assigned thereto a rail minimum sensor 88 which outputs a rail minimum signal to the control device 60 if no preforms 8 are present within its sensor range. In this case, the control device 60 outputs a stop signal to the further processing system 10 such that said further processing system can be shut down until preforms 8 are once again ready to be output to the further processing system 10.

It must be mentioned for the sake of completeness that the bulk material feeding device 14 can comprise a different apparatus for feeding bulk material into the silo 26 in place of a tipping device 12. The silo 26 can also be realized as a "silo rucksack" in place of a so-called silo belt. The conveyor device 36 does not necessarily have to be realized as an overhead conveyor 34 nor the separating-into-singles system 42 as a roller sorter. Correspondingly different forms of realization which fulfill the same task are generally known.

It must also be mentioned that hydraulic drives can also be used in place of gear motors for the drives.

The invention claimed is:

1. An apparatus for serially charging a further processing system with objects which are in the form of bulk material, said apparatus having a bulk material feeding device (14) which comprises a feed drive (22), a silo (26) to which the objects (8) are feedable as bulk material by means of the bulk material feeding device (14), a control device (60) which is connected to the feed drive (22) and actuates the feed drive (22) in order to refill the silo (26) with objects, a conveyor device (36) which is connected downstream of the silo (26) and comprises a conveyor drive (40), and a separating-into-singles system (42) which comprises a separating-into-singles drive (48), wherein the conveyor device (36) feeds objects (8) from the silo (26) in a disordered manner to the separating-into-singles system (42) and the latter aligns the objects (8) fed to it and forwards the aligned objects in the direction of the further processing system (10), characterized in that the conveyor device (36) and the separating-into-singles system (42) comprise sensors (62) which are connected to the control device (60) and the single control device (60) also controls the conveyor drive (40) and the separating-into-singles drive (48);

wherein the bulk material feeding device (14) comprises a tipping device (12) with a pivotable tipper part (18) which is driven by the feed drive (22), the feed drive (22), controlled by the control device (60), pivots the tipper part (18) back and forth within an operating range between a lower loading position (24) and an upper unloading position, the loading position (24) and the unloading position each have assigned thereto a positional switch (66, 68), which is connected to the control device (60), and the control device (60) stops the feed drive (22) when the tipper part (18) actuates the relevant positional switch (66, 68).

2. The apparatus as claimed in claim 1, wherein the silo (26) has assigned thereto a fill level sensor (72), which is connected to the control device (60), and the control device (60) actuates the feed drive (22) in dependence on the fill level of the silo (26) which is determined by way of the fill level sensor (72).

3. The apparatus as claimed in claim 1, wherein the silo (26) comprises a silo container (28) and a silo conveyor belt (30) which is driven by a belt drive (32), which is controlled by the control device (60), wherein the silo conveyor belt (30) conveys objects (8) from the silo container (28) to the conveyor device (36).

4. The apparatus as claimed in claim 3, wherein the conveyor device (36), which is preferably realized as an overhead conveyor (34), comprises in its starting region an overfill sensor (74), which is connected to the control device (60), and the control device (60) stops the belt drive (32) at an overfill signal from the overfill sensor (74).

5. The apparatus as claimed in claim 1, wherein, in its inlet region, the separating-into-singles system (42) comprises an overfilling sensor (76), which is connected to the control device (60), and the control device (60) stops the conveyor drive (40) and, where applicable, the belt drive (32) at an overfilling signal from the overfilling sensor (76).

6. The apparatus as claimed in claim 1, wherein the loading position (24) and the unloading position each have assigned thereto an emergency limit switch (70), which is connected to the control device (60), and the control device (60) triggers an emergency stop of the feed drive (22) when the tipper part (18) overshoots the operating range and, at the same time, actuates the relevant emergency limit switch (70).

7. The apparatus as claimed in claim 1, wherein the separating-into-singles system (42) comprises a maximum sensor (78), which is connected to the control device (60), and the control device (60) stops the conveyor drive (40), and preferably where applicable the belt drive (32), at a maximum signal from the maximum sensor (78).

8. The apparatus as claimed in claim 1, characterized in that the separating-into-singles system (42) comprises a normal sensor (82), which is connected to the control device (60), and the control device (60) controls the speed of the separating-into-singles drive (48) and preferably of the conveyor drive as well as, where applicable, of the belt drive in dependence on a normal signal from the normal sensor (82).

9. The apparatus as claimed in claim 1, wherein the separating-into-singles system (42) has connected downstream thereof a feed rail (54), to which the separating-into-singles system (42) feeds the objects (8) one after another and in an aligned manner and which forwards the objects (8) to the further processing system (10).

10. The apparatus as claimed in claim 9, wherein, in an upstream end region, the feed rail (54) comprises a rail maximum sensor (84), which is connected to the control device (60), and the control device (60)—when filling the feed rail with aligned objects (8)—outputs a ready signal to the further processing system (10) at a rail maximum signal.

11. The apparatus as claimed in claim 1, wherein the separating-into-singles system (42) comprises a return belt (50), which is driven by a return drive (52), which is controlled by the control device (60), and which conveys incorrectly aligned objects (8), which have been separated out by the separating-into-singles system (42), back into the silo (26), to the conveyor device (36) or to the start of the separating-into-singles system (42).

12. An apparatus for serially charging a further processing system with objects which are in the form of bulk material, said apparatus having a bulk material feeding device (14) which comprises a feed drive (22), a silo (26) to which the objects (8) are feedable as bulk material by means of the bulk material feeding device (14), a control device (60) which is connected to the feed drive (22) and actuates the feed drive (22) in order to refill the silo (26) with objects, a conveyor device (36) which is connected downstream of the silo (26) and comprises a conveyor drive (40), and a separating-into-singles system (42) which comprises a separating-into-singles drive (48), wherein the conveyor device (36) feeds objects (8) from the silo (26) in a disordered manner to the separating-into-singles system (42) and the latter aligns the objects (8) fed to it and forwards the aligned objects in the direction of the further processing system (10), characterized in that the conveyor device (36) and the separating-into-singles system (42) comprise sensors (62) which are connected to the control device (60) and the single control device (60) also controls the conveyor drive (40) and the separating-into-singles drive (48);

wherein the bulk material feeding device (14), where applicable the tipping device (12), comprise a safety light grid (64) which is connected to the control device (60), and the control device (60) stops the feed drive (22) when the safety light grid (64) detects an obstacle.

13. An apparatus for serially charging a further processing system with objects which are in the form of bulk material, said apparatus having a bulk material feeding device (14) which comprises a feed drive (22), a silo (26) to which the objects (8) are feedable as bulk material by means of the bulk material feeding device (14), a control device (60) which is connected to the feed drive (22) and actuates the feed drive (22) in order to refill the silo (26) with objects, a conveyor device (36) which is connected downstream of the silo (26) and comprises a conveyor drive (40), and a separating-into-singles system (42) which comprises a separating-into-singles drive (48), wherein the conveyor device (36) feeds objects (8) from the silo (26) in a disordered manner to the separating-into-singles system (42) and the latter aligns the objects (8) fed to it and forwards the aligned objects in the direction of the further processing system (10), characterized in that the conveyor device (36) and the separating-into-singles system (42) comprise sensors (62) which are connected to the control device (60) and the single control device (60) also controls the conveyor drive (40) and the separating-into-singles drive (48);

wherein the separating-into-singles system (42) comprises a minimum sensor (80), which is connected to the control device (60), and the control device (60) increases the speed of the separating-into-singles drive (48) and preferably of the conveyor drive as well as, where applicable, of the belt drive at a minimum signal from the minimum sensor (80).

14. An apparatus for serially charging a further processing system with objects which are in the form of bulk material, said apparatus having a bulk material feeding device (14) which comprises a feed drive (22), a silo (26) to which the objects (8) are feedable as bulk material by means of the bulk material feeding device (14), a control device (60) which is connected to the feed drive (22) and actuates the feed drive (22) in order to refill the silo (26) with objects, a conveyor device (36) which is connected downstream of the silo (26) and comprises a conveyor drive (40), and a separating-into-singles system (42) which comprises a separating-into-singles drive (48), wherein the conveyor device (36) feeds objects (8) from the silo (26) in a disordered manner to the separating-into-singles system (42) and the latter aligns the objects (8) fed to it and forwards the aligned objects in the direction of the further processing system (10), characterized in that the conveyor device (36) and the separating-into-singles system (42) comprise sensors (62) which are connected to the control device (60) and the single control device (60) also controls the conveyor drive (40) and the separating-into-singles drive (48);

wherein the separating-into-singles system (42) has connected downstream thereof a feed rail (54), to which the separating-into-singles system (42) feeds the objects (8) one after another and in an aligned manner and which forwards the objects (8) to the further processing system (10);

wherein, in a downstream end region, the feed rail (54) comprises a rail minimum sensor (88), which is connected to the control device (60), and the control device (60) outputs a stop signal to the further processing system (10) at a rail minimum signal from the rail minimum sensor (88).

\* \* \* \* \*